(12) United States Patent
Diepenbrock, IV et al.

(10) Patent No.: US 9,558,266 B1
(45) Date of Patent: Jan. 31, 2017

(54) SYSTEM AND METHOD FOR DISCOVERING GROUPS WHOSE MEMBERS HAVE A GIVEN ATTRIBUTE

(71) Applicants: Anthony Bernard Diepenbrock, IV, San Francisco, CA (US); Charles W. Moyes, III, San Francisco, CA (US)

(72) Inventors: Anthony Bernard Diepenbrock, IV, San Francisco, CA (US); Charles W. Moyes, III, San Francisco, CA (US)

( * ) Notice: Subject to any disclaimer, the term of this patent is extended or adjusted under 35 U.S.C. 154(b) by 741 days.

(21) Appl. No.: 13/624,971

(22) Filed: Sep. 24, 2012

(51) Int. Cl.
*G06F 17/30* (2006.01)

(52) U.S. Cl.
CPC ... *G06F 17/30705* (2013.01); *G06F 17/30713* (2013.01)

(58) Field of Classification Search
CPC ............ G06F 17/30705; G06F 17/3071; G06F 17/30713
USPC ........................................................ 707/737
See application file for complete search history.

(56) References Cited

U.S. PATENT DOCUMENTS

| | | | | |
|---|---|---|---|---|
| 8,046,411 B2* | 10/2011 | Hayashi et al. | ............... | 709/204 |
| 8,452,851 B2* | 5/2013 | Kabiljo | ............. | G06F 17/30861 |
| | | | | 705/1.1 |
| 2007/0214141 A1* | 9/2007 | Sittig et al. | ........................ | 707/7 |
| 2009/0070435 A1* | 3/2009 | Abhyanker | ................... | 709/218 |
| 2010/0293057 A1* | 11/2010 | Haveliwala et al. | ...... | 705/14.66 |
| 2012/0166285 A1* | 6/2012 | Shapiro | ............. | G06Q 30/0251 |
| | | | | 705/14.58 |

OTHER PUBLICATIONS

Mishra, Schreiber, Stanton, Tarjan, Finding Strongly-Knot Clusters in Social Networks, Nov. 2, 2009, Internet Mathematics Journal.

* cited by examiner

*Primary Examiner* — Jorge A Casanova

(57) ABSTRACT

A method for discovering a group defined by a common characteristic is disclosed. The method includes building representation of a portion of a social network based on a starting person with the given characteristic, the person also providing the person's gender and school affiliation. The social network representation is then searched to discover clusters therein meeting certain size and connectivity requirements with respect to the network. After the clusters in the network are discovered, clusters having a high degree of similarity are merged together. The resulting clusters, both merged and non-merged, are then scored to determine the cluster that best fits the original group. The winning cluster is then returned to the starting person who confirms the correctness of the cluster. The set of the persons in a confirmed cluster are then displayed to the starting person.

17 Claims, 9 Drawing Sheets

SYSTEM AND METHOD FOR DISCOVERING GROUPS WHOSE MEMBERS HAVE A GIVEN ATTRIBUTE

FIELD OF THE INVENTION

The present invention relates generally to discovering a group of friends defined by a common attribute in a friend network.

DESCRIPTION OF THE RELATED ART

A friend network can be viewed as a graph whose vertices are persons and whose edges indicate a friend relationship, F(v1, v2). This graph can be exceedingly large and highly interconnected. The graph also contains auxiliary information about the friends in the graph, but this information is disjointed and unconnected in the graph. Thus, the graph is not, by itself, helpful in discovering groups of persons possessing a common attribute. For example, if one desires to know a group of persons in the graph who are members of an organization, there is no simple way to find this group directly from the graph. However, it is certainly desirable to use the friend network to groups having a common attribute for a variety of purposes. For example, it may be desirable to discover a group of persons all of whom have the same a common interest and to present this group to a party for marketing purposes. Thus, a problem with the friend graph exists in that it provides connectivity based on only one property, friendship, making it difficult to discover groups of people in the graph with a common attribute.

BRIEF SUMMARY

An embodiment solves the problem of finding groups of people in a friend network having a common characteristic. The embodiment performs this task extremely quickly and with a minimum of input information. One benefit is that a group of persons for which a common attribute exists is now presentable for a variety of purposes. For example, if a merchant desires to sell goods or services to the group, then the discovery of the group is exceedingly valuable to the merchant. As another example, the discovered group can be used to increase social dynamics in a game or other application.

BRIEF DESCRIPTION OF THE DRAWINGS

These and other features, aspects and advantages of the embodiments will become better understood with regard to the following description, appended claims, and accompanying drawings where:

DETAILED DESCRIPTION OF THE INVENTION

Figure 1:
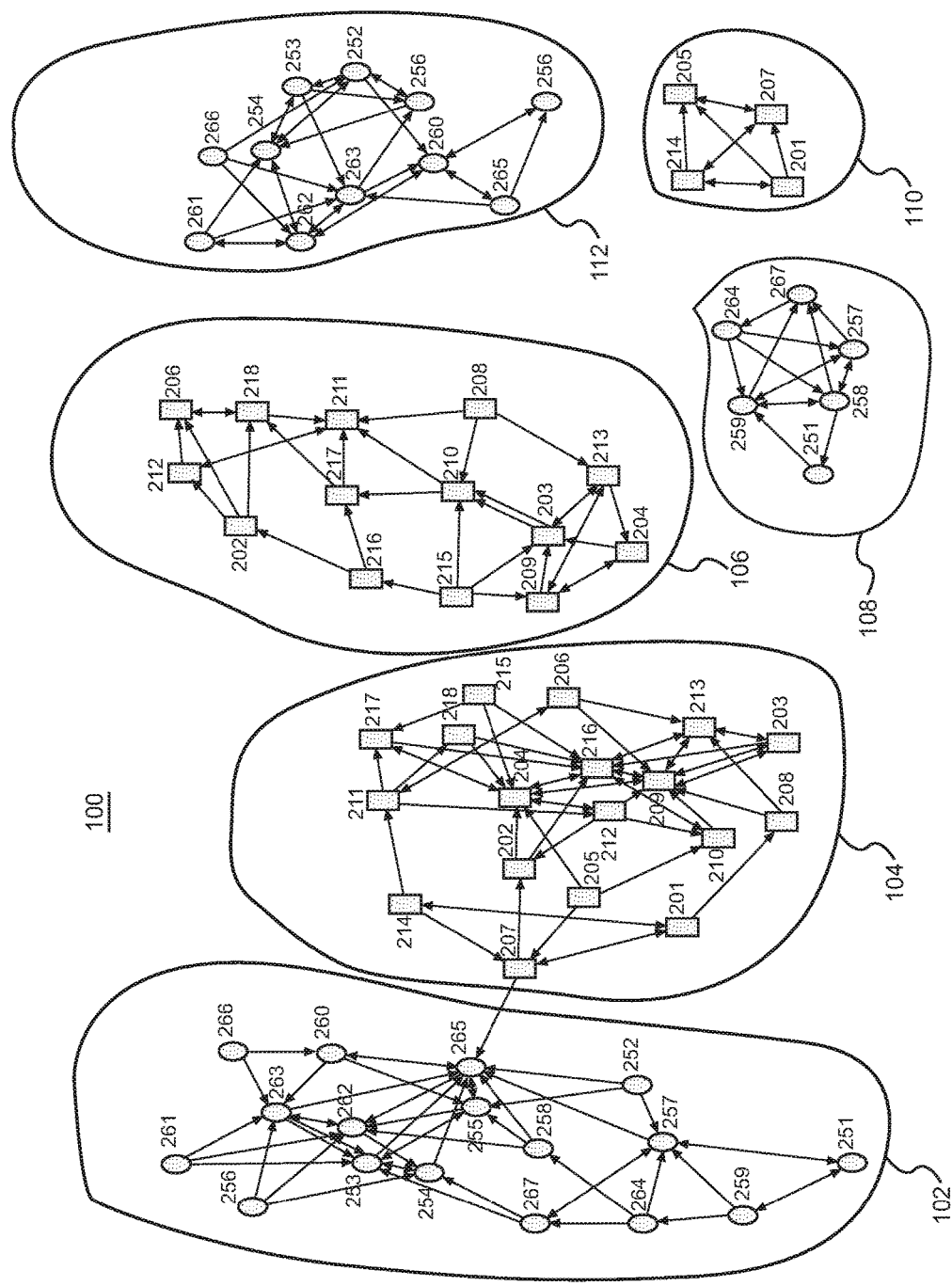
FIG. 1 depicts a sample friend network.

FIG. 1 depicts a sample friend network. The network is an undirected graph having vertices representing people and edges representing a bidirectional friend relationship. A graph of this type can have many connections among vertices, 201-217, 251-265, multiple groupings 102, 104, 106, 108, 110, 112, and even disconnected groups 106, 108, 110, 112. The popular site, Facebook, provides access, via an API, to a friend or social graph that includes hundreds of millions of people. In one embodiment, the Facebook social graph is accessed to construct an adjacency matrix for a graph on which further processing occurs.

Figure 2:
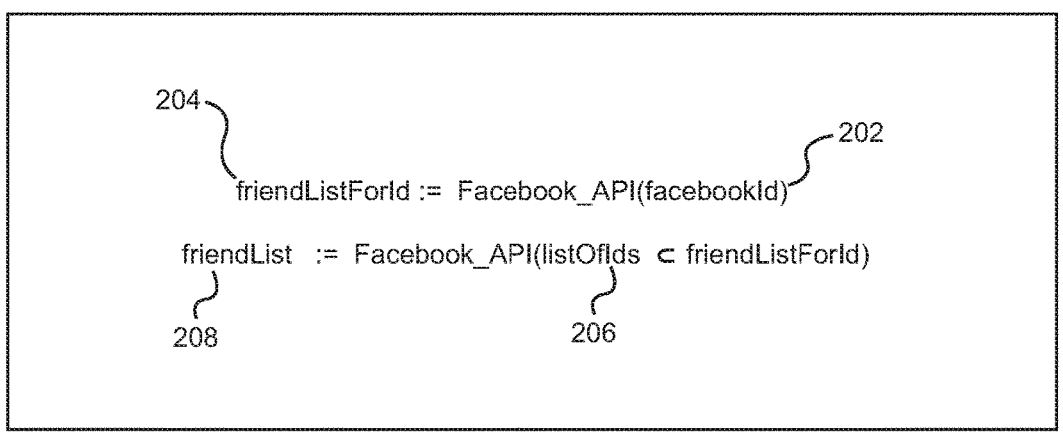
FIG. 2 depicts input information from which a group may be discovered.

FIG. 2 depicts input information from which a group or organization may be discovered. In one embodiment, the input information is obtained from a person, hereinafter "the starting person," who visits a website that is generally related to a group or organization in which the visiting person is a member. To register at the website the person offers his Facebook id 202 and permission to access the person's friend list 204 on Facebook. Along with this information, other information that normally accompanies a user object in Facebook, such as the user's name, the user's picture, the user's gender, the user's locale, and age range is available from the starting person. The Facebook ID provides input to an API to obtain the friend list for the given Facebook ID and from a subset 206 of the friend list id a friend list 208 is constructed.

Figure 3:
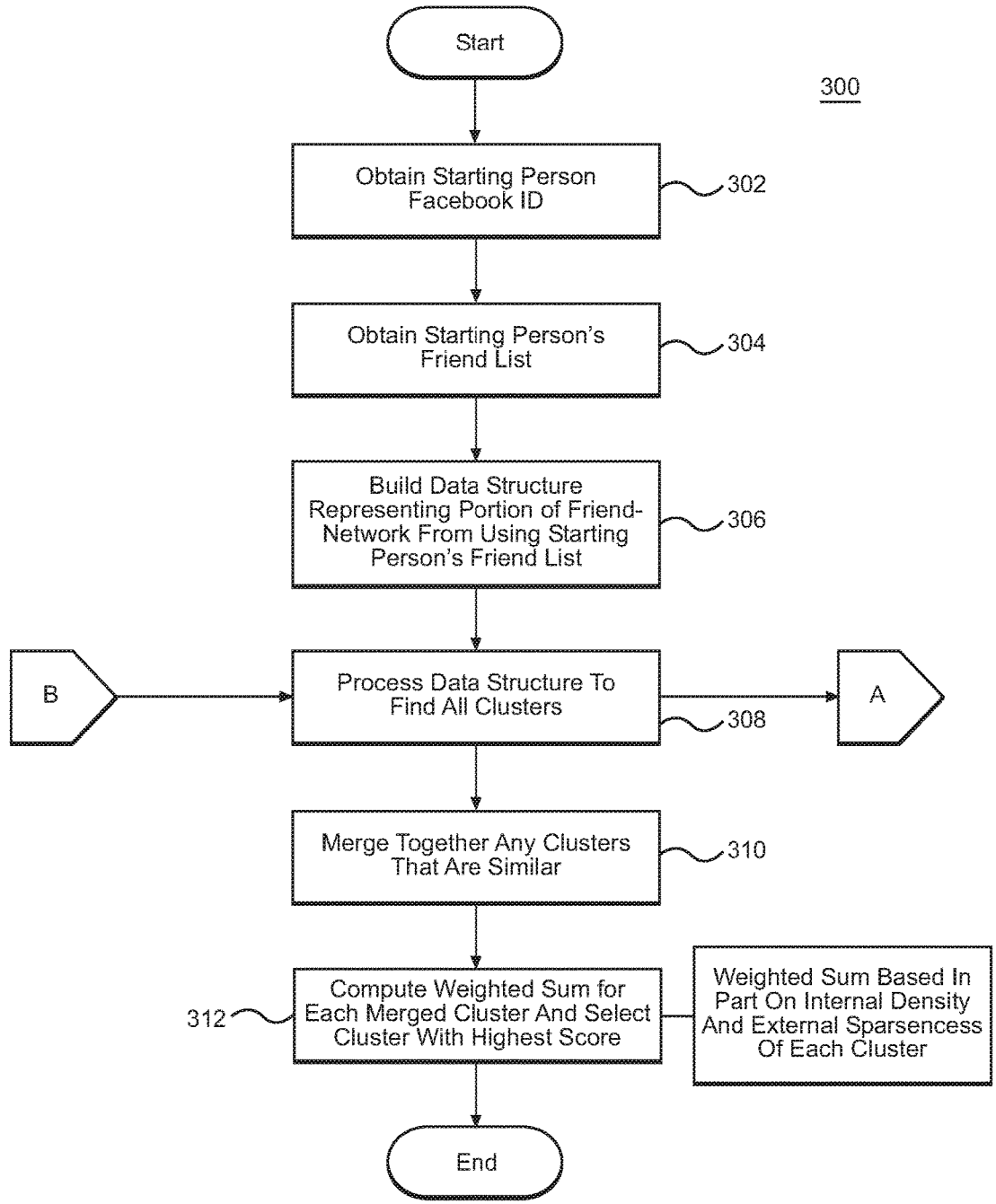
FIG. 3 depicts an algorithm for discovering a group.

FIG. 3 depicts an algorithm for discovering a group in accordance with an embodiment. In step 302, the starting person's Facebook ID is obtained. In step 304, through the starting person's Facebook id, the starting person's list of friends is obtained. Then, with this list, in step 306 the process uses a Facebook API to obtain the friends of each person in the list. In one embodiment, the Facebook API is a FQL Open Graph API and the API queries a JSON-formatted list of the starting person's friends to obtain the friends of each person in the starting person's list. In another embodiment, the process divides the starting person's list of friends into a set of sublists, say with each sublist having 10 to 50 items, and issues multi-queries, with the sublist as a parameter, to obtain the friends of each person in the sublist, thereby reducing the number of queries needed and improving efficiency. The result of the queries is a network of friends centered on the starting person. The network contains only two degrees of friendship, counting from the starting person. In other words, only mutual friends of the starting person's friends are in the network.

Also in step 306, the process constructs an adjacency list to represent the network obtained from the queries. The adjacency list is a convenient data structure for representing the network in what follows. The adjacency list representation, in one embodiment, is a list of size |V|, the number of vertices in the network, with indexes into the edge list for each V, and then a list of size |E|, the number of edges, for the edges. For example, the vertex list is

[index_$v0$,index_$v1$,index_$v2$ . . . index_$vn$].

The edge list is

[vertices connected to $v0$, vertices connected to $v1$, vertices connected to $v2$, . . . vertices connected to $vn$].

Thus, an index for a particular vertex in the vertex list provides a pointer to the portion of the edge list having vertices connected to the particular vertex. Alternatively, any data structure that can represent the network obtained from the queries will do. For example, an adjacency matrix is sufficient to represent the network.

The process then proceeds to construct the 2-neighbors for a given vertex after constructing the adjacency list. In one embodiment, the 2-neighbors are determined by visiting each 1-neighbor of a given vertex and determining if the 1-neighbor has a neighbor other than the particular vertex. If so, then this fact is recorded in a separate list. After all of the vertices of each 1-neighbor are visited, the list has all of the 2-neighbors of the given vertex. In one embodiment, the 1-neighbor list and the 2-neighbor list are bit maps. The 2-neighbors are used in the process of discovering clusters in the adjacency list.

In step 308, the process operates to discover any clusters present in the adjacency list. The clusters sought are the collections of nodes that are internally dense and externally sparse. The algorithm for finding clusters is explained in more detail below.

The search for clusters produces several or many clusters some of which are similar to each other. To handle these multiple similar clusters, the process constructs a convenient data structure for merging clusters that are similar to each other. In one embodiment, the data structure is a tree. In another embodiment, the data structure is a list. In the case of a tree structure, the process traverses in step 310 the tree from the bottom to the top, merging pairs of clusters that have a high degree of similarity. In the case of a list, the process traverses the list merging odd and even clusters. The merging occurs according to a criterion, which in one case is a relative cluster overlap threshold. If A and B are two clusters and the threshold is a value $\kappa$, then the relative cluster overlap criterion is that $|A \cap B| \geq \kappa$. Thus, the number of members in common must be at least $\kappa$. In one embodiment, the value $\kappa$ is 3.

When the merging process is completed, several merged clusters and possibly unmerged clusters remain. The process then determines the $\alpha$ and $\beta$ coefficients for each remaining cluster. The merging process is described in more detail in connection with FIG. 5.

Next, the process determines which of the clusters, merged or otherwise, corresponds to the group sought for. To find the best cluster, the process computes, in step 312, a weighted sum function, $$w = w(ms, gs, ss, \alpha, \beta)$$

for each cluster based on its $\alpha$ and $\beta$ coefficients and any number of additional parameters. In one embodiment, the parameters include a gender score gs, a school score ss, and a member score ms, but any number of other parameters such as location, age, or last name of the family of the starting person can be included. In the above weighted sum function, the gender score is the fraction of members in the cluster having the same gender as the starting person. The school score is the fraction of members in the cluster attending the same school as the starting person. The member score is derived from a triangle distribution function with a range of [0,1] that is centered around the approximate size of the organization of which the starting person is a member. For example, if the size of the organization is 50, then the ms score is $$ms = 1 - \max(0, \min|\text{NumMembersInSameSchool} - 50|/50),$$

which computes a number between 0 and 1, depending on the number of members in the same school as the starting person. For example, if the number of members in the same school is 50, then the function has a value of 1. If the number of members in the same school is 0 or 100, then the score has a value of 0. In one embodiment, the weight sum calculation is $=(1 \cdot ms + 1 \cdot gs + 1 \cdot ss + 0.25 \cdot (1-\alpha) + 1 \cdot \beta)$, where the weights for ms, gs, and ss and $\beta$ are unity and the weight for $(1-\alpha)$ is 0.25.

The result of the weighted sum is a score and the cluster with the highest score is most likely the cluster sought after. The cluster with the highest core is then presented to the starting person, who then confirms that whether or not the cluster is correct, i.e., that it corresponds to a group of which the starting person is a member. If the cluster is not correct, the process presents to the starting person an alternative cluster, one that scored slightly lower, to find out if the alternative cluster is correct. If the cluster is correct, then those persons in the cluster other than the starting person are added to the site to which the starting person gave his Facebook id, so that the starting person can see all of the members of the group of which he or she is a member.

Figure 4:
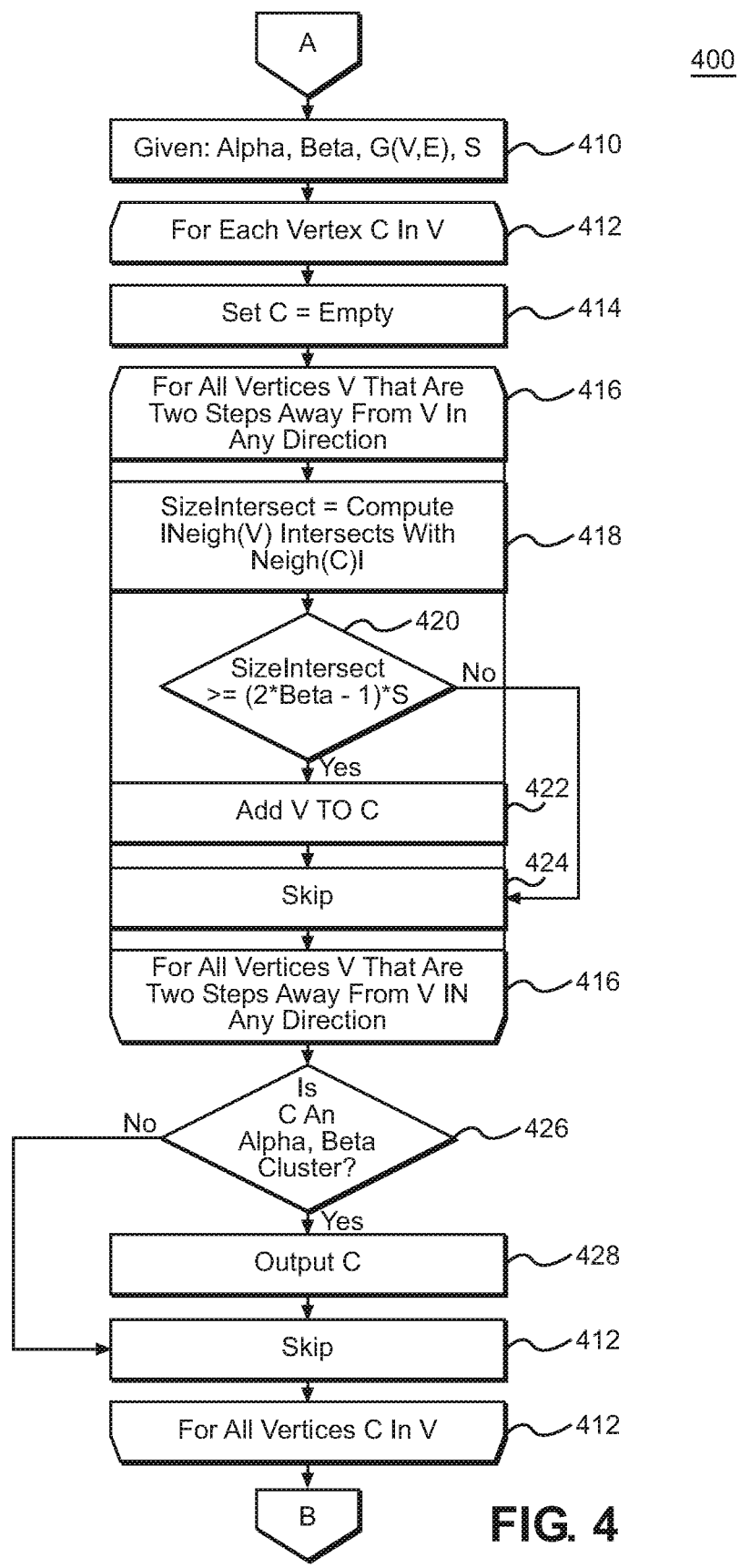
FIG. 4 illustrates an algorithm for finding a cluster in a graph.

FIG. 4 illustrates an algorithm for finding a cluster in a graph. The graph G has V vertices and E edges (G=(V,E)). A vertex v∈V has a set of neighbors, denoted N(v) and the vertices that are r hops around the vertex are designated $B_r(v)$. Vertices within 2 hops of a given vertex are those in $B_2(V)$. The coefficient $\alpha$ refers to the degree of connectivity outside of a cluster and the coefficient $\beta$ refers to the degree of connectivity within a cluster. A cluster C is considered internally dense if for each vertex in the cluster, the number of edges between it and any other vertex in the cluster is at least $\beta*|C|$, where $|C|$ is the number of vertices in the cluster. A cluster c is externally sparse if for each vertex not in the cluster C, the number of edges between it and any other vertex in the cluster is at most $\alpha*|C|$. When the $\beta$ coefficient approaches unity, then the internal density is very high and the cluster is called a clique. When the $\alpha$ coefficient approaches zero, then the cluster is disconnected. Typically, a cluster has $\alpha < \beta$. The size of a cluster is denoted by s. The algorithm in FIG. 4 starts, in step 410 with a given graph, G=(V,E) and desired $\alpha$ and $\beta$ coefficients, along with the size s of the cluster desired to be found. After initializing the set to be returned, in step 414, The algorithm then looks, in step 416, at each vertex c in the graph and decides if the vertices v within a specified hop $B_r$ (c) should be added, in step 422, into a set that may become a cluster. The decision, in step 420, for including the vertices within a specified hop into the set is whether the number of vertices in the intersection, computed in step 418, of two neighborhoods is at least equal to a particular threshold, where the threshold is $(2\beta-1) \cdot s$. In step 418, one neighborhood is the one around the vertex c and the other neighborhood is the one around each vertex within the specified hop around the vertex c. Thus, if the two neighborhoods have sufficient vertices in common, as determined in step 420, then the vertex c is included in the set, in step 422, that may become a cluster. The set thus constructed becomes a candidate for a cluster and the candidate is then tested, in step 426, for its alpha and beta coefficients. If the candidate passes the test, then it is output as a cluster. In one embodiment, the alpha coefficient is within a range of about 0 to 0.25 and the beta coefficient is within the range of about 0.75 to 0.85.

In one embodiment, the algorithm illustrated in FIG. 4 is processed on a graphics processing unit (GPU), such as the GeForce GTX 560, which has 336 internal processors. In this embodiment, the adjacency list is partitioned among the internal processors in the GPU, such that the internal processors concurrently build candidate clusters from each non-overlapping adjacency list portion. This permits the clusters in the adjacency list to be found in $O(n^3)$ time, where n is the number of vertices in the adjacency list.

In another embodiment, the algorithm illustrated in FIG. 4 is processed via an adjacency list that has been compressed into a bit map in order to reduce the amount of memory required. A 5000-friend graph can be handled in about 3 Megabytes (MB). The conversion to bit maps reduces memory usage to $O(n^2/8)$, where n is the number of friends (vertices) in the graph. In this embodiment, not only is the adjacency list stored as a bit map, but the 2-neighbors are also stored as bit maps.

Figure 5:
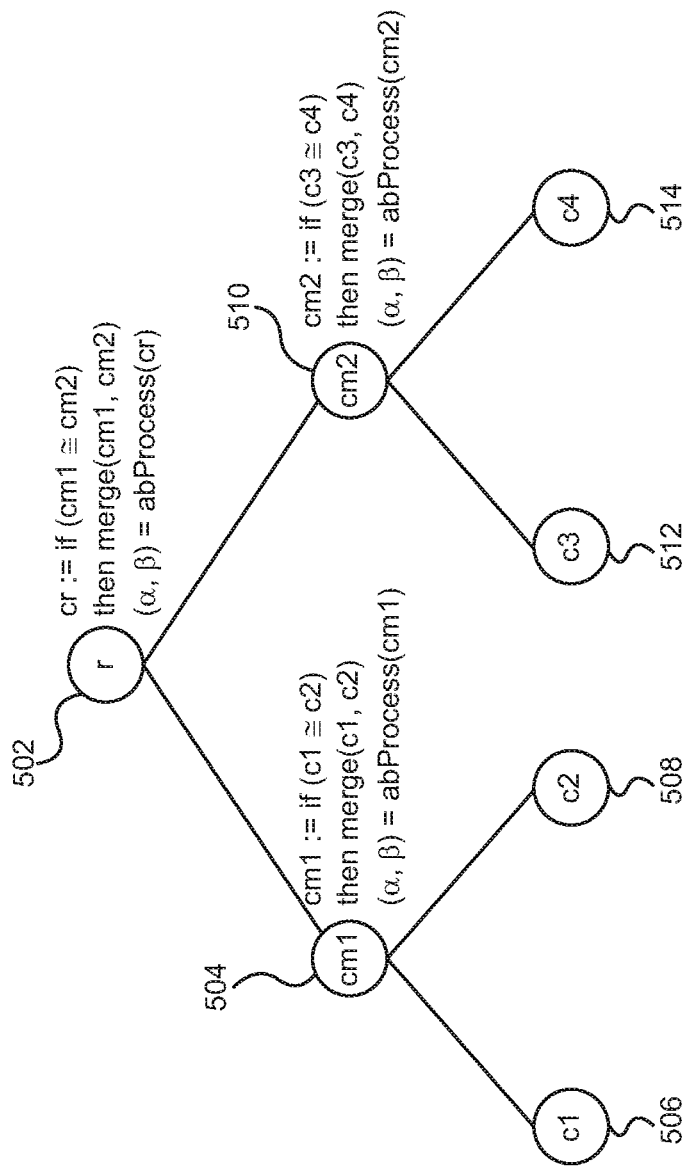
FIG. 5 illustrates the merging process in FIG. 3 in more detail.

FIG. 5 illustrates an embodiment of the merging process in more detail. In the figure, node r 502 is the root node of a tree whose leaves contain clusters, c1 506, c2 508, c3 512, and c4 514, found in the adjacency list. At node cm1 504, a test is performed to determine whether c1 506 and c2 508 are sufficiently similar that they should be merged. If so, then c1 506 and c2 508 are merged an entered into the cm1 504 node. Similarly, a test is performed at node cm2 510 to determine if clusters c3 512 and c4 514 are sufficiently similar to be merged. If so, then c3 512 and c4 514 are merged and entered into the cm2 510 node. At the root node 502, a test is performed to determine if the clusters at cm1 504 and cm2 510 are sufficiently similar to be merged. If so, the merged cluster is entered into the root node 502. The result of this process is that there are fewer clusters to be considered in the next step of the process.

In one embodiment, the merging process is performed on a Graphics Processing Unit (GPU), such as the GeForce GTX 560. In this embodiment, the multiple internal cores in the GPU operate in parallel to perform each stage of the merging and synchronize with each other before the next stage's processing is performed. For example, the merging of clusters c1 506 and c2 508 is performed in one core in the GPU while the merging of clusters c3 512 and c4 514 is performed in another core in the GPU. A synchronization is performed so that merging at the cr 502 node waits for the two cores to complete their respective operations. It is apparent that in a GPU with 336 internal cores, up to 336 different clusters can be merged concurrently, thereby significantly lowering the processing time for this operation. Additionally, in this embodiment, the alpha and beta coefficients $(\alpha, \beta)$ of the merged clusters are computed in parallel.

In the GPU embodiment, the clusters and the merged clusters are stored as binary in the memory available to the GPU.

Figure 6:
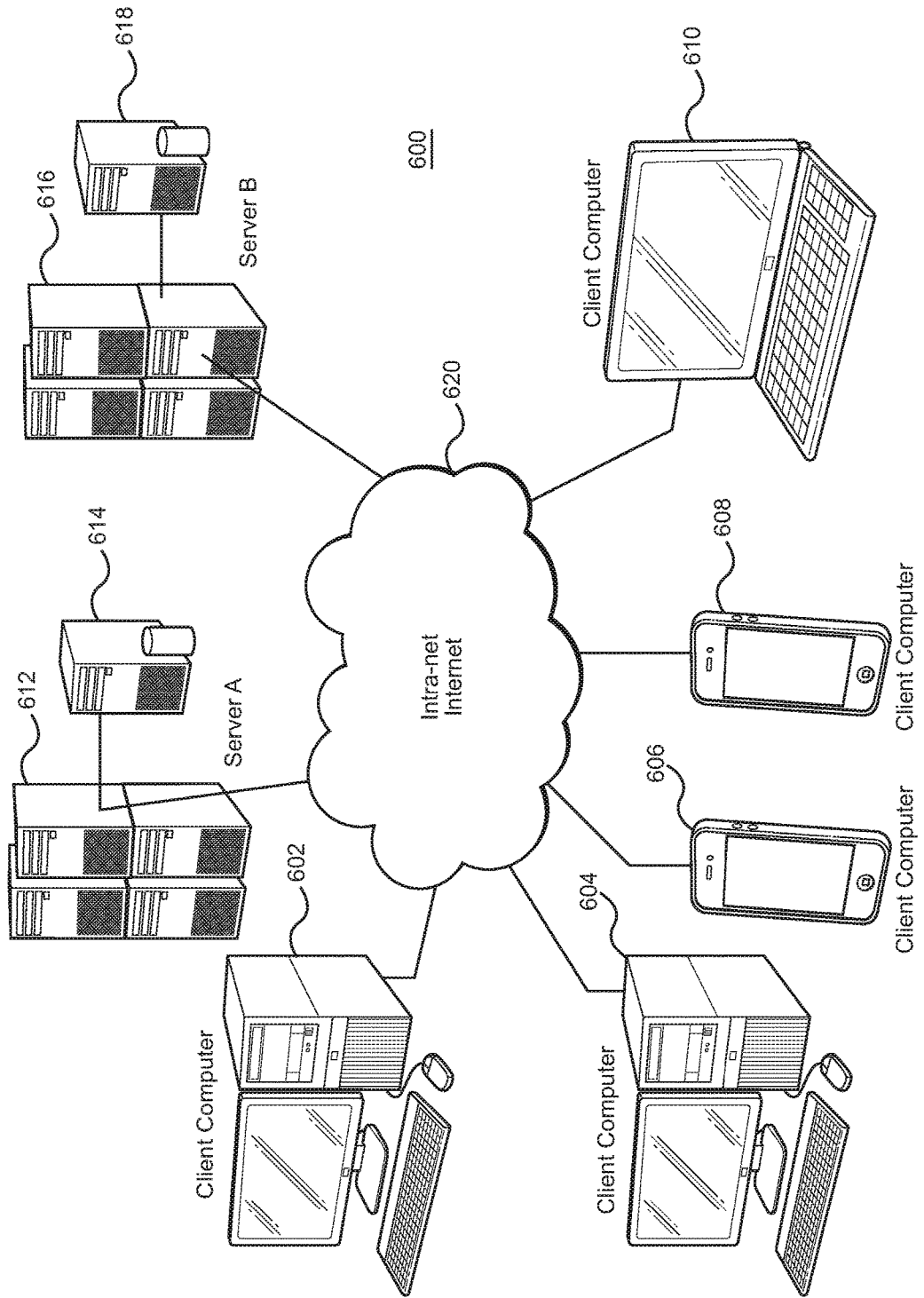
FIG. 6 is a system setting in which an embodiment is practiced.

FIG. 6 is a system setting 600 in which an embodiment can be practiced. The system setting, on which methods in accordance with an embodiment operate, includes one or more client computing devices 602, 604, 606, 608, 610, such personal computers 602, 604, PDAs 608, tablet computers 608, or laptop computers 610, a server 612, that hosts a friend network and which is connected to a large database system 614, and an application server 616, which has access to a large storage system 618. The client computing devices 602-610 and the servers 612, 616 are interconnected via an intranet or an internet 620. In one embodiment, the internet is the Internet.

Figure 7:
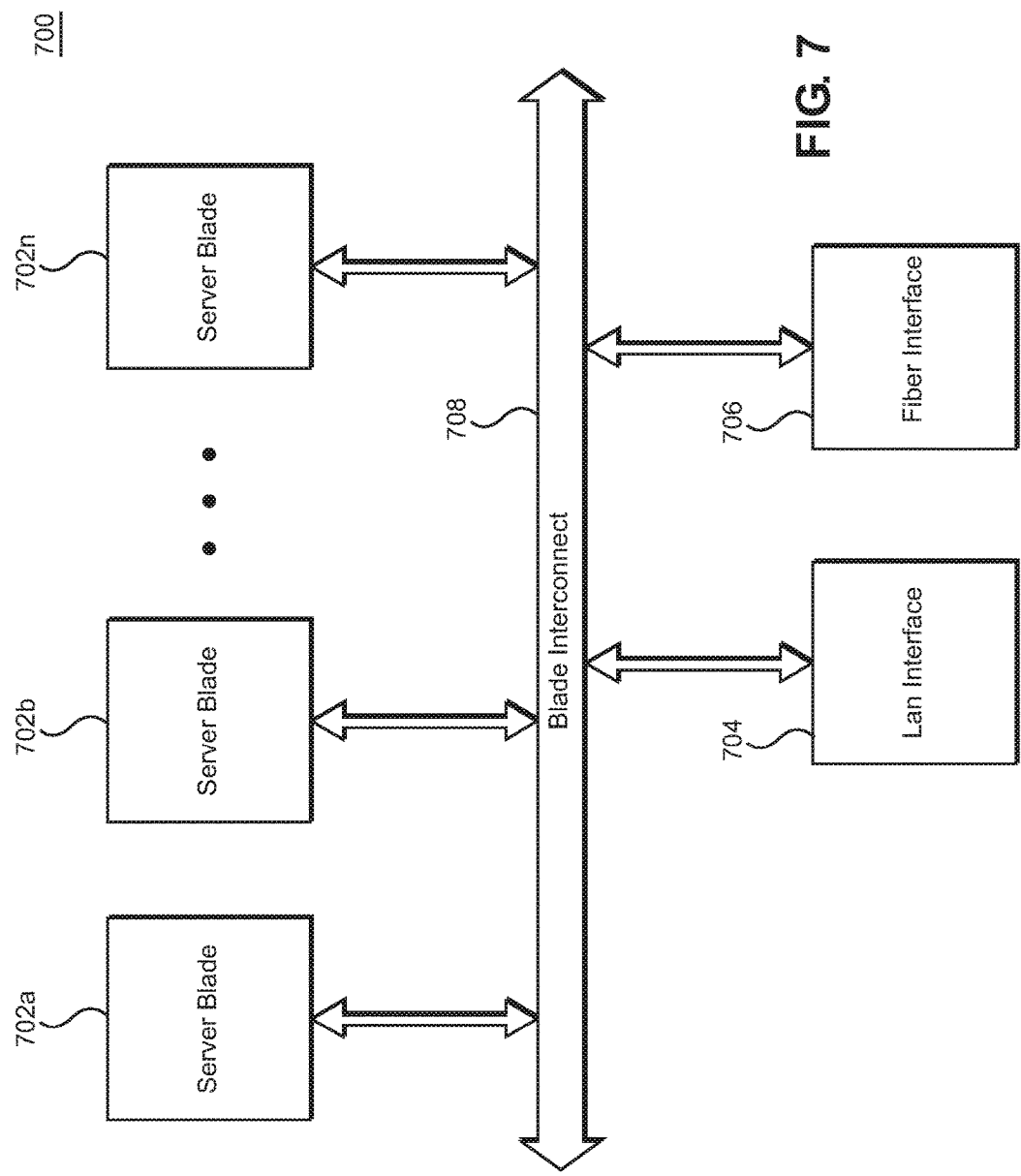
FIG. 7 is an example configuration of a server as depicted in FIG. 6.

FIG. 7 is an example configuration of a server 612, 614 as depicted in FIG. 6. The server 612, 616 includes one or more server blades 702a . . . 702n, a local area network (LAN) interface 704 and a fiber interface 706, which are interconnected via a blade interconnect 708. In one embodiment, a blade interconnect 708 is a crossbar switch. The server blades obtain information, such as data and instructions, from either the LAN interface 704 or the fiber interface 706.

Figure 8:
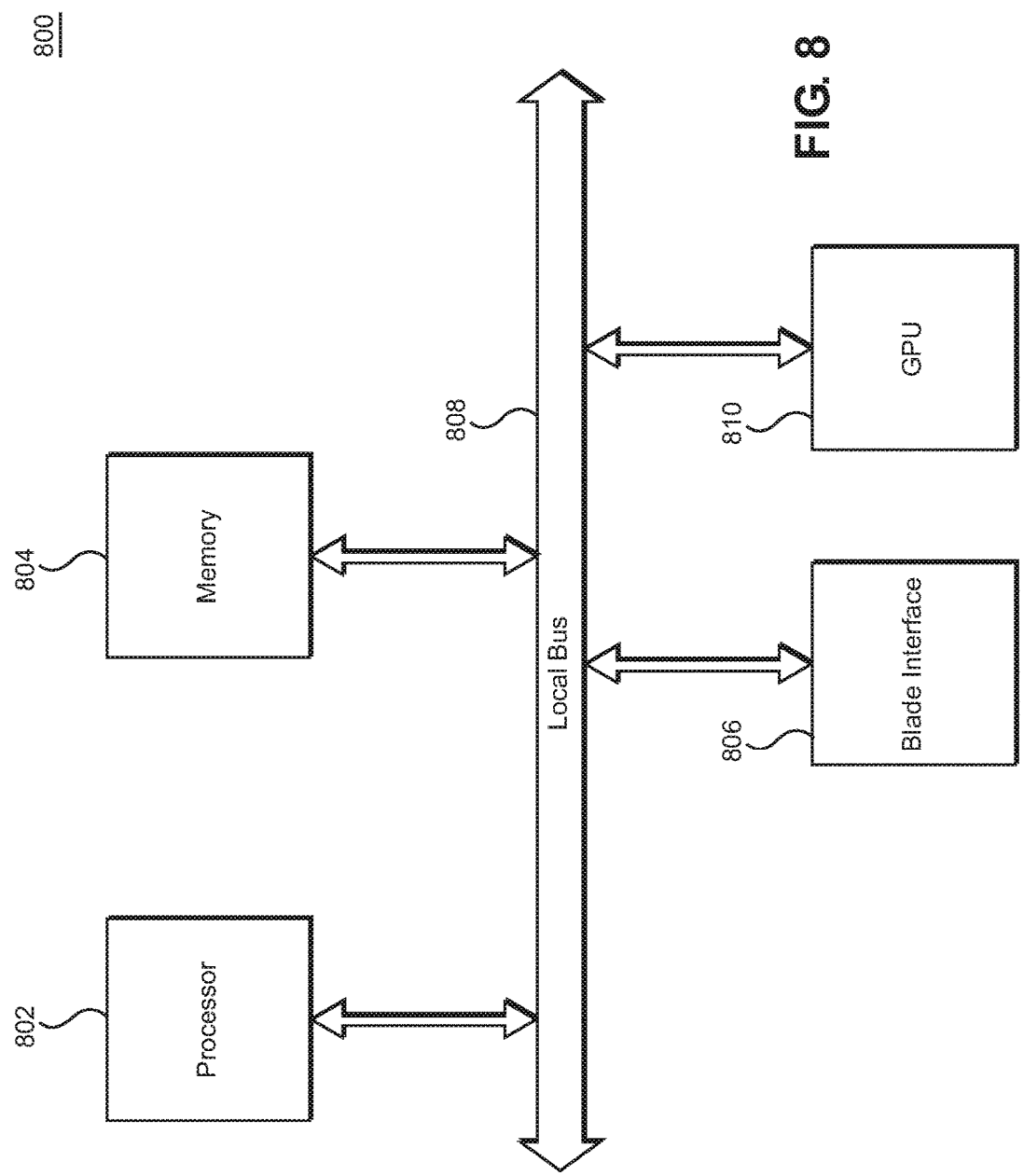
FIG. 8 is an example configuration of a server place for a server as depicted in FIG. 7.

FIG. 8 is an example configuration of a server blade 702a . . . 702n for a server as depicted in FIG. 7. The server blade 702a . . . 702n includes one or more processors 802, a memory 804, a graphics processing unit (GPU) 810 such as a general purpose GPU (GPGPU), and a blade interface 806, which are interconnected via a local bus 808. The processors 802 typically have instruction set architectures. The memory 804 is typically a non-transitory repository for program instructions on which the processor 802 operates. The program instructions in the memory 804 are typically loaded through the blade interface 806 from a large storage array connected to the server blade 702a . . . 702n via the LAN interface 704 or fiber interface 706. Thus, the program instructions that are executed by the processors 802 in the server blades are stored in a non-transitory computer-readable medium such as a large storage array. In one embodiment, the large storage array is a RAID-array or an array of non-rotating, silicon disk drives.

Figure 9:
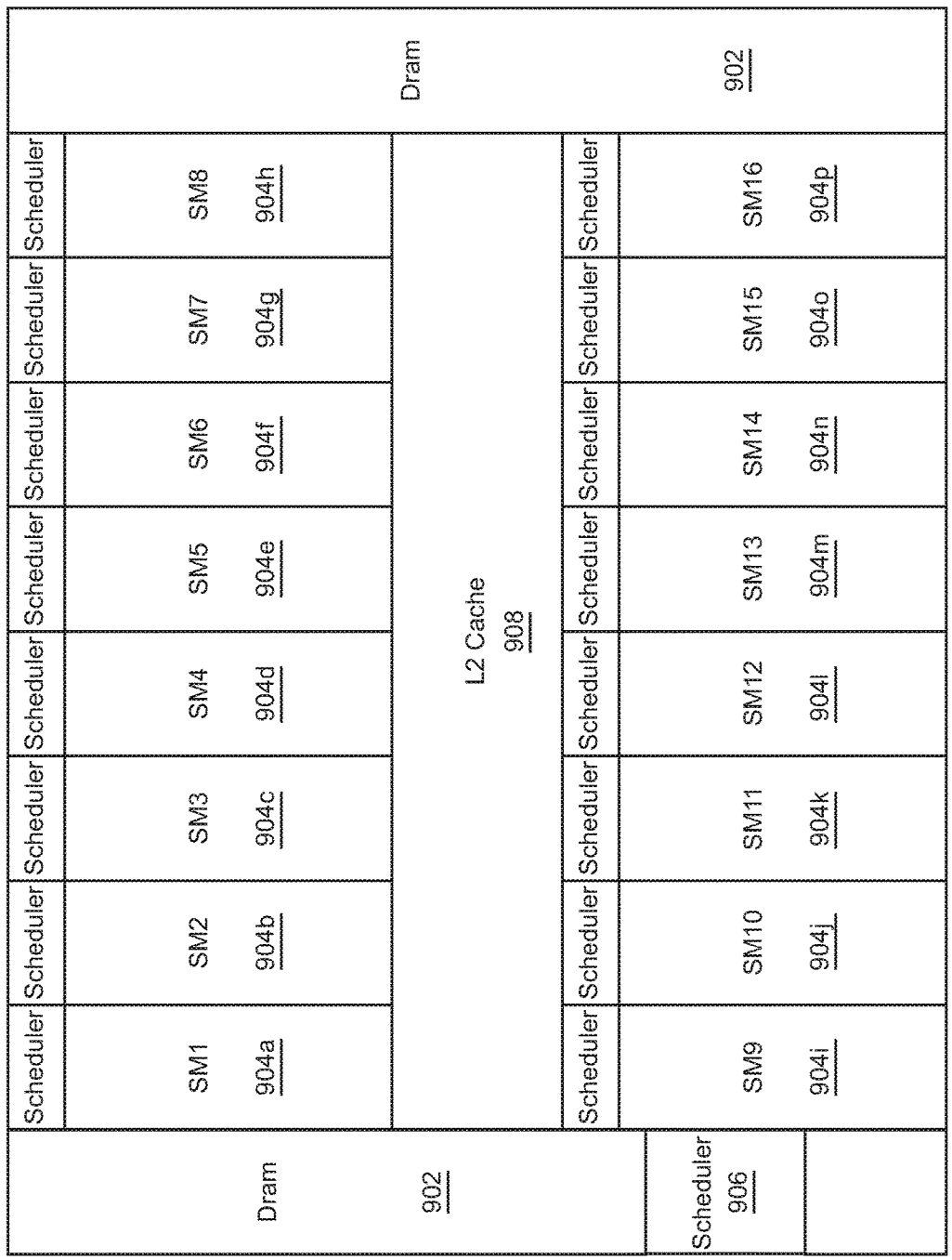
FIG. 9 is an example configuration of a graphics processing unit.

In one embodiment, the GPGPU, shown in FIG. 9, includes up to up to 6 Gigabytes of DRAM 902, L2 cache 908 and 512 cores, where a core executes one integer or floating-point instruction per clock for a thread. The cores are organized into blocks of 32 cores, which are in turn organized into to grids of 16 blocks. Each core has its own, private local memory, each block has its own, shared memory, and each grid has access to global memory. The 512 cores are thus organized into 16 streaming multiprocessors (SM) 904a-p, each having 32 cores. A scheduler 906 in the GPU distributes a block of threads to each of the streaming multiprocessors 904a-p, which then dispatches the threads to each of its 32 cores. Thus, if a task permits it, a GPU can execute up to 512 threads, concurrently.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for discovering a group defined by a common characteristic, the method comprising:

building a data structure that represents a portion of a friend-network of a starting person, wherein the starting person has a given characteristic and the starting person provides one or more items of personal data;

wherein building the data structure includes:

obtaining an id of the starting person in a social network;

accessing a friend list in the social network using the starting person's id;

entering into the data structure each friend in the friend list that has one degree of friendship with the starting person; and;

entering into the data structure each friend having one degree of friendship with each friend in the starting person's friend list;

discovering clusters in the data structure and collecting the discovered clusters into a set, wherein each discovered cluster has a given size, internal density, and external sparseness;

for any clusters in the set that are sufficiently similar to each other, merging together the similar clusters in the set, wherein similarity is determined by a relative cluster overlap threshold;

computing a weighted sum based at least on the internal density and external sparseness of each cluster in the set to select a cluster having a high probability of representing the members of the group; and if the starting person indicates that the selected cluster accurately includes the members of the group, displaying the members in the selected cluster.

2. The method of claim 1, wherein the given characteristic is membership in a given group or organization.

3. The method of claim 1, wherein the internal density and external sparseness are respectively represented by an alpha coefficient and a beta coefficient; and wherein the weighted sum is further based on the one or more items of personal data.

4. The method of claim 1, wherein the one or more items of personal data include the gender of the starting person and the school of the starting person.

5. The method of claim 1, wherein the one or more items of personal data include a geographic location of the starting person.

6. The method of claim 1, wherein the one or more items of personal data include an age of the starting person.

7. The method of claim 1, wherein discovering clusters in the data structure includes:

building a candidate cluster;

testing whether the candidate cluster has the given internal density and external sparseness; and outputting the cluster as a discovered cluster if the candidate cluster has the given size, internal density and external sparseness.

8. The method of claim 7, wherein building a candidate cluster includes:

for each vertex of the network in the data structure, determining a first neighborhood of vertices about the vertex, determining a second neighborhood of vertices about vertices that are within two hops from the vertex, and adding the vertex to a candidate cluster if the first and second neighborhoods have sufficient vertices in common.

9. The method of claim 7, wherein building a candidate cluster includes:

partitioning the data structure into one or more smaller data structures, each smaller data structure having a non-overlapping subset of the data structure; and building concurrently candidate clusters from the smaller data structures.

10. The method of claim 1, wherein merging similar clusters includes:

entering clusters into nodes of a tree structure;

combining pairs of nodes into a parent node of the tree if the nodes have clusters that are sufficiently similar; and returning the tree structure.

11. The method of claim 10, wherein combining pairs of leaves into a parent node includes combining at least one pair of leaves concurrently with another pair of leaves.

12. A computer-readable medium carrying one or more sequences of instructions for discovering a group defined by a common characteristic, wherein execution of the one or more sequences of instructions by one or more processors causes the one or more processors to perform the steps of:

building a data structure that represents a portion of a friend-network of a starting person, wherein the starting person has a given characteristic and the starting person provides one or more items of personal data; and wherein building the data structure includes:

obtaining an id of the starting person in a social network;

accessing a friend list in the social network using the starting person's id;

entering into the data structure each friend in the friend list that has one degree of friendship with the starting person; and entering into the data structure each friend having one degree of friendship with each friend in the starting person's friend list;

discovering clusters in the data structure and collecting the discovered clusters into a set, wherein each discovered cluster has a given size, internal density, and external sparseness;

for any clusters in the set that are sufficiently similar to each other, merging together the similar clusters in the set, wherein similarity is determined by a relative cluster overlap threshold;

computing a weighted sum based at least on the internal density and external sparseness of each cluster in the set to select a cluster having a high probability of representing the members of the group; and if the starting person indicates that the selected cluster accurately includes the members of the group, displaying the members in the selected cluster.

13. The computer-readable medium of claim 12, wherein the given characteristic is membership in a given group or organization.

14. The computer-readable medium of claim 12, wherein the internal density and external sparseness are respectively represented by an alpha coefficient and a beta coefficient; and wherein the weighted sum is further based on the one or more items of personal data.

15. The computer-readable medium of claim 12, wherein merging similar clusters includes:

entering clusters into nodes of a tree structure;

combining pairs of nodes into a parent node of the tree if the nodes have clusters that are sufficiently similar; and returning the tree structure.

16. A system for discovering a group defined by a common characteristic, the system comprising:

one or more processing units, each unit including:

a processor; and a memory coupled to the processor in the processing unit; and a graphics processing unit coupled to the memory and including a plurality of processing cores and memories coupled to respective ones of the cores, wherein each core is capable of operating concurrently with respect to the other cores in the graphics processing unit;

wherein each memory contains instructions, which, when executed by the one or more processing units, perform the steps of:

building a data structure that represents a portion of a friend-network of a starting person, wherein the starting person has a given characteristic, and wherein the starting person provides one or more items of personal data;

discovering clusters in the data structure and collecting the discovered clusters into a set, wherein each discovered cluster has a given size, internal density, and external sparseness; and wherein discovering clusters and collecting the discovered clusters is performed by the processing cores in the graphics processing unit;

for any clusters in the set that are sufficiently similar to each other, merging together the similar clusters in the set, wherein similarity is determined by a relative cluster overlap threshold;

computing a weighted sum based at least on the internal density and external sparseness of each cluster in the set to select a cluster having a high probability of representing the members of the group; and if the starting person indicates that the selected cluster accurately includes the members of the group, displaying the members in the selected cluster.

17. The system of claim 16, wherein the step of merging together similar clusters is performed by the processing cores in the graphics processing unit.

* * * * *